Figure 1:
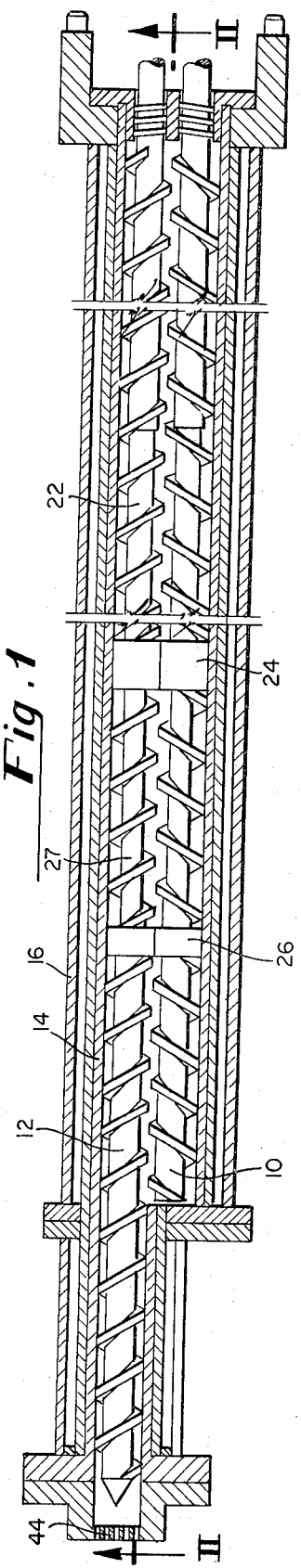

United States Patent [19]

Skidmore

[11] 3,799,234
[45] Mar. 26, 1974

[54] COUNTERCURRENT VAPOR STRIPPING IN SCREW DEVOLATILIZER

[75] Inventor: Richard H. Skidmore, Strafford, Pa.

[73] Assignee: Welding Engineers, Inc., King of Prussia, Pa.

[22] Filed: Feb. 22, 1971

[21] Appl. No.: 117,332

[52] U.S. Cl. ............... 159/2 E, 159/47 R, 425/203
[51] Int. Cl. ...... B01d 1/28, B01d 1/00, A01j 17/00
[58] Field of Search ................ 159/2 E, 6 W, 47 R; 425/203

[56] References Cited
UNITED STATES PATENTS

| | | | |
|---|---|---|---|
| 2,949,447 | 8/1960 | Hawkins et al. | 260/93.7 |
| 3,253,892 | 5/1966 | Brignac et al. | 23/285 |
| 2,048,286 | 7/1936 | Pease | 259/192 |
| 2,944,047 | 7/1960 | Schutze et al. | 260/88.2 |
| 3,203,943 | 8/1965 | Houser et al. | 260/93.7 |
| 3,211,209 | 10/1965 | Latinen et al. | 159/6 W |
| 3,343,216 | 9/1967 | Merrill et al. | 425/197 |
| 3,376,603 | 4/1968 | Colombo | 425/203 |
| 3,535,737 | 10/1970 | Hendry | 259/191 |

*Primary Examiner*—Jack Sofer

[57] ABSTRACT

Volatile components are stripped countercurrently from a plastic material in a screw extruder filled with such material by injecting a gas into the material and removing a significant portion of the gas combined with the volatile components at a point upstream from the point of injection.

12 Claims, 2 Drawing Figures

INVENTOR.
Richard H. Skidmore

COUNTERCURRENT VAPOR STRIPPING IN SCREW DEVOLATILIZER

This invention relates to a process and apparatus for removal of volatile components from plastic material in a screw extruder and particularly to such a process and apparatus for removal of residual amounts of solvent in a polyolefin in a multistage screw extruder-devolatilizer.

Devolatilization of plastic material, such as polyolefins, in a screw extruder, as the material is worked and heated by the extruder, through vapor vents located along the length of the extruder, is well known. One such process and apparatus in which such vapor draw offs are maintained at successively lower pressures in successive stages is disclosed and claimed in my U.S. Pat. No. 3,082,816. While this process and apparatus is effective to remove a substantial proportion of the solvent from the plastic mass, there remains in most cases residual solvent in the amount of from 1,000 to a 5,000 parts per million. The presence of this residual solvent deleteriously affects many of the physical characteristics of the resin.

The patent to Schnell et al. U.S. Pat. No. 3,267,075 discloses a process for removing impurities from polycarbonates, in which impurities are subjected to removal by injection of inert materials. In polycarbonates, which contain chlorides, water is not an inert material and its use in polycarbonates is contraindicated. The process of the Schnell patent provides co-current flow of the inert material with the polycarbonate, with the result that the inert material contains a maximum amount of impurities as it leaves the polycarbonate. This limits the effectiveness of the stripping operation.

By contrast, the process of the present invention provides active stripping with steam or other inert gaseous material, and stripping is achieved surprisingly in a countercurrent manner, with the great advantage that the clean incoming steam contacts the cleanest portion of the polymer, radically reducing the percentage of impurities finally appearing in the product. Also, it has been discovered that there is almost no limitation on the quantity of stripping steam that can be used in such countercurrent flow in an extruder; this provides the opportunity for even greater stripping capability.

It is therefore an object of the present invention to provide a process and apparatus for effective and economical removal of volatile components, particularly small residual amounts thereof, from a plastic mass in a screw extruder.

It is also an object of the present invention to provide a continuous screw extruder for working and devolatilizing the plastic mass including improved means for removing therefrom small residual amounts of volatile component.

Still further, it is an object of this invention to provide a practical and economical screw extruder apparatus for removing small residual amounts of a volatile component.

These and other objects, which will be apparent from the description of the invention which follows are met, briefly, by a process and apparatus in which a gas, such as steam, is injected for flow countercurrently to the flow of the plastic into a screw extruder filled with plastic material and at least a major part of the gas, combined with a volatile component to be removed from the plastic material, is removed through a vent means in the extruder located at a point upstream from the point of injection of the gas.

In one embodiment of the present invention, for example, polyethylene in an approximately 40 percent solids solution in hexane is partially devolatilized in a conventional manner. At that point the material contains 0.1 to 1.0 percent by weight of hexane. For many applications this percentage is too high. The devolatilized polyethylene mass is then stripped of residual volatile components, in accordance with the present invention, in a separate sealed stage of the extruder into which a gas, such as steam, is injected. According to this invention the injected gas, combined with volatile components stripped from the plastic, is removed at a location upstream of the point of injection. It has been noted that some of the injected gas also moves downstream but that at least the majority moves upstream.

It is important, according to this invention, that the steam passes through the polymer countercurrently with agitation, stripping out the solvent molecules; the stripping action does not depend upon diffusion of solvent or volatile impurities through the plastic mass.

Also in a further preferred embodiment of the present invention, the vapor and gas removal is accomplished through twin interlocking screws pitched and rotated so as to return solid materials to the extruder while selectively permitting the escape of gases therethrough. Preferably, this vapor removal vent is connected to a pressure reducing means such as an aspirator or vacuum pump to enhance the vapor removal process further.

Although not part of the present invention, the volatile component removal process may be even further enhanced by the injection into the plastic mass of water for purposes of cooling the plastic mass at a point downstream of a pressure seal which is downstream of the steam injection and withdrawal points. A subsequent reduced pressure vapor removal vent not only removes the water thus injected but also carries off with it some of the steam previously injected along with volatile components combined therewith.

Figure 2:
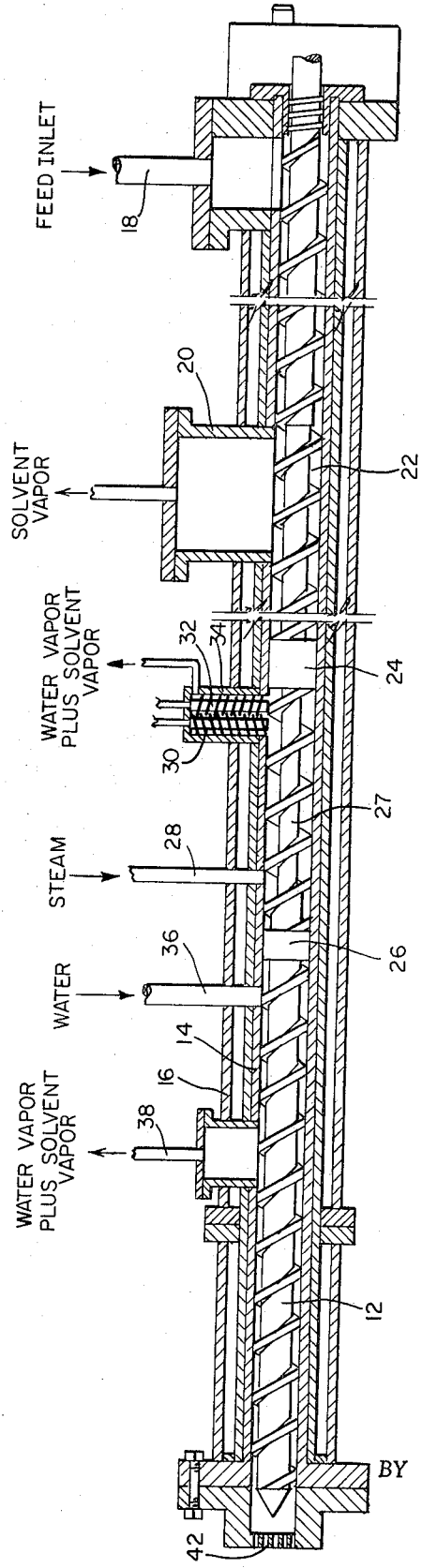

This invention may be better understood by reference to the following detailed description, taken in conjunction with the accompanying drawings in which:

FIG. 1 is a sectional plan view of a twin screw extruder including the volatile component removal section of the present invention; and FIG. 2 is a sectional side view of the extruder and volatile component removal section shown in FIG. 1.

Referring now to FIGS. 1 and 2, twin extruder screws 10 and 12 are enclosed in a housing or barrel 14 surrounded by a heating jacket 16. Material entering through feed inlet 18 is worked and conveyed by screws 10 and 12 to at least one vapor removal section which includes a vapor removal vent 20 adjacent to a reduced-diameter shaft section 22 of the extruder screws. Several such vapor removal sections may be utilized in a known manner; the vapor removal pressure in each may be controlled independently when the stages are separated by pressure seals of the plastic material, which seals are formed by cylindrical or reverse-pitch screw segments.

Following one or more devolatilization sections as illustrated in FIGS. 1 and 2, residual amounts of volatile components in the plastic mass are removed according to this invention in a separate section of the extruder apparatus which includes a first pressure seal-forming pair of cylinders 24 and a back pressure pair of seal-forming cylinders 26. In the segment of the extruder screws between the sealing cylinders 24 and 26, a reduced-diameter-shaft screw section 27 is provided so that a low pressure is maintained in the plastic mass near the vent 30. However, the screw section 27 is so pitched that the downstream part of section 27 is kept filled by the back pressure means 26 and is maintained at a pressure that is substantially higher than the material pressure adjacent to the vent 30.

According to this invention, an injection means 28 for a gas such as steam is provided upstream of seal 26 and downstream of seal 24. Injection means 28 may include one or more inlets into the extruder barrel and is, of course, connected to a source of injected gas, such as a steam generator, not shown. Vent 30 is provided at a point in the same extruder section 27 upstream from the point of injection. Vent 30, if desired, may be connected to a pressure reducing device such as an aspirator or vacuum pump.

It is important that the gas injection be made at a point intermediate a higher pressure downstream point and a lower upstream pressure point, and that the injection pressure be less than said higher pressure and greater than said lower pressure.

This is considered surprising; it has been discovered that it is not the direction of flow of the viscous pressurized plastic material that determines the direction of flow of the injected gas, but that the relative upstream and downstream pressures instead control. Further, it is surprising that the injected gas readily and in great volume flows countercurrent to the viscous pressurized plastic material in the spaces provided in the extruder. The invention is, accordingly, of great advantage when, the plastic material is starve-fed at the upstream, low pressure area, when the screws are full and under pressure at the point of gas injection, and when the material is at a higher pressure downstream of the point of injection.

With respect to the vent 30, because the tendency of such a vent to clog with solids escaping with the gas, a preferred vapor removal means comprises twin interlocking screws 32 surrounded by a closely fitting housing 34, with a clearance sufficient to permit only gases to pass through. Twin interlocking screws 32 are pitched and rotated by a drive motor (not shown) in a direction to force entrained solids back toward the plastic mass in the main extruder.

In the form of the apparatus shown in FIGS. 1 and 2, there is also shown an optional water inlet means 36 for purposes of injecting cooling water into the plastic mass. This water is removed in vapor removal vent 38 downstream thereof, in which there is also removed some of the gas injected in the gas injection means 28. Plastic material treated in the apparatus and thus devolatilized is then extruded through die 42.

In accordance with this invention, it has been discovered that substantially all of the volatile components can be removed from a plastic mass in a screw extruder by injecting into the moving pliable plastic mass a non-reactive gas, i.e. non-reactive with the plastic mass, which becomes mixed intimately by countercurrent flow with the plastic mass forming a dispersed vapor phase therein, with the result that the volatiles are removed along with the injected gas through a vent provided for that purpose. The gas must of course, be injected at a pressure above that of the plastic mass. It is preferred to keep the pressure of the plastic mass reasonably low at the point of injection, such as by using a reduced-diameter shaft on the extruder screw in the area of gas injection, in order to facilitate the handling and injection of the gas.

The gas to be injected may be selected from a wide variety of substantially non-reactive gaseous materials. The usual requirement is that the gas be non-reactive with the plastic material.

While this invention is useful in treating polyolefins, such as polyethylene, various other polymers and polymer-solvent systems may also be treated. In particular, polymers such as polystyrene, polypropylene, polycarbonates and others may be purified in accordance with this invention.

The quantities of plastic material throughput, volatile materials to be removed therefrom, gas to be injected therein, and the size and relative dimensions of the apparatus used in the present invention are all interrelated. The amount of gas injected for removing volatile components in accordance with the present invention may surprisingly be varied greatly; if desired tremendous volumes of gas may be injected and removed countercurrently and this flow rate may readily be varied depending upon the desired degree of purity to be achieved and the throughput rate of the plastic material.

Generally, as a specific example, it has been found in a (small) 2-inch screw diameter twin screw extruder having a 21-inch stripping section with a 1.125-inch diameter shaft and a pressure in the plastic mass of about 140 pounds per square inch, steam at 200° C and 260 pounds per square inch may be injected conveniently at a rate of about 50 pounds per hour to strip essentially all of the remaining hexane-cyclohexane solvent from a 95 to 98 percent solids solution entering the stripping section at a rate of about 250 pounds of polymeric material per hour.

As examples of residual solvent removal from a 40 percent solids solution of polyethylene in mixed hexane-cyclohexane solvent, utilizing an apparatus such as that shown in FIGS. 1 and 2 having 2-inch screws with three stages of vapor removal, having vapor draw-offs respectively at 50 pounds per square inch gauge back pressure, atmospheric, and near vacuum, and in which reverse flights downstream of the steam injection point were used to keep the extruder screw filled in the steam injection and steam removal vent area, and in which the shaft diameter in the same area was 1.125 inches, the following process runs have been made, with the results indicated.

| Sample No. | 29 | 23 | 30 |
|---|---|---|---|
| Throughput rate — PPH | 103 | 103 | 108 |
| Solvent at entry to vapor stripping section — PPM | 9708 | 15,599[1] | 9259 |
| Gas injected | None | Steam[2] | Steam |
| Injection Temperature °C | | 174 | 183 |
| Injection Pressure — PSIG | | 115 | 140 |
| Gas removed upstream of injection point — PPH | | 40 | 143 |
| Gas removed downstream of injection point — PPH | | 1.52 | 3.9 |
| Solvent content in product — PPM | 497 | 0 | 0 |

[1]4920 in feed; 10,679 added
[2]and water

The following is claimed:

1. In a process for removal of a volatile component from a plastic material, the steps which comprise working said material and component in a downstream direction in a zone of an extruder, a downstream portion of said zone being filled with said material under pressure, maintaining said material at a lower pressure at an upstream portion of said zone, injecting a gas into said plastic material at said downstream portion where said material is in a viscous condition and fully fills the inter-flight space at the point of injection, and removing said gas together with said volatile component at said upstream portion of said zone.

2. A process as recited in claim 1 wherein said gas is steam.

3. A process as recited in claim 1 wherein said plastic material is a polyolefin and said gas is steam.

4. A process as recited in claim 1 wherein said plastic material is polyethylene and said gas is steam.

5. A process as recited in claim 1 wherein said combined gas and volatile component is removed by venting through a low pressure port.

6. The process defined in claim 1, wherein said plastic material, at a location downstream of said point of injection, is maintained at a higher pressure than the pressure at said injection point.

7. Apparatus for removing volatile components from a plastic material, said apparatus comprising a screw extruder having a zone, a downstream portion of which is completely full of said plastic material in a viscous condition, said zone also having an upstream portion which is at a lower pressure than said downstream portion, means for injecting a gas into said material at said downstream portion and at a pressure higher than that of said material, and vent means upstream of said injecting means for removing from said material said gas combined with said volatile component, at a pressure lower than that at the point of injection.

8. Apparatus defined in claim 7, wherein said vent means comprises twin interlocking screws arranged and rotated to prevent said plastic material from leaving said apparatus, a housing for said screws, open at one end to said apparatus, the clearance around said screws being limited so as to selectively permit the escape essentially of gases only from said apparatus.

9. An improved apparatus, as recited in claim 7, wherein said gas injecting means comprises a steam source and a conduit therefrom to said apparatus.

10. An improved apparatus, as recited in claim 7, wherein said vent means is connected to a pressure reducing means.

11. The apparatus defined in claim 7, wherein means are provided downstream of said injection point for maintaining said plastic material at a higher pressure than the pressure at said injection point.

12. Apparatus defined in claim 7, wherein means are provided for starve-feeding said material at said upstream portion.

* * * * *